Figure 1:
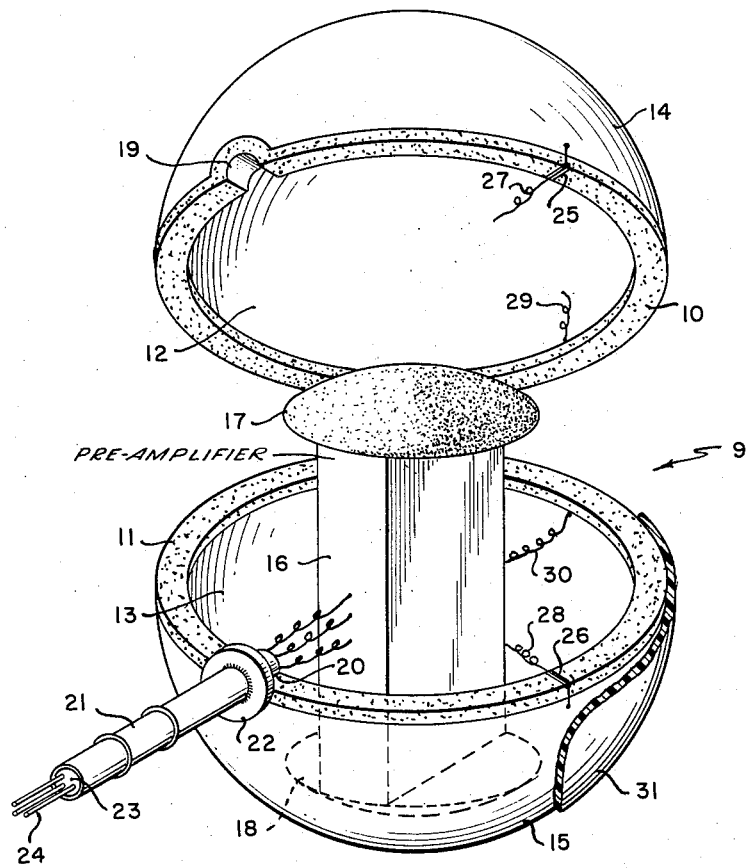

Nov. 30, 1965 A. R. MILNE 3,221,296

SPHERICAL HYDROPHONE

Filed Jan. 18, 1961

INVENTOR.

ALLEN R. MILNE

BY

ATTORNEY

United States Patent Office 3,221,296
Patented Nov. 30, 1965

3,221,296
SPHERICAL HYDROPHONE
Allen R. Milne, Victoria, British Columbia, Canada, assignor to Her Majesty the Queen in right of Canada as represented by the Minister of National Defence
Filed Jan. 18, 1961, Ser. No. 83,583
Claims priority, application Canada, Jan. 21, 1960, 790,826
1 Claim. (Cl. 340—10)

This invention relates to a hydrophone to be used to detect underwater sound waves in audio and sub-audio frequencies.

Heretofore it has been possible to use a small hydrophone with a pre-amplifier to receive sub-audio as well as audio frequencies by suspending the apparatus from a fixed reference in still water. The transducer is normally a piezo-electric ceramic of cylindrical annular shape enclosing a pressure release material and the whole is sealed in a waterproof sheath. By pressure release material is meant a material having a low acoustic impedance compared to the medium external the transducer. The sensitivity of the transducer is achieved by applying a high voltage to electrodes attached to the inner and outer surfaces thereof which polarizes the piezo-electric ceramic. Thereafter the application of pressure to the exterior of the ceramic will cause a potential difference to appear between the electrodes.

When such a hydrophone is suspended above bottom in the open ocean at the end of a cable containing the input and output power leads, there is a relative motion of the hydrophone and its support through the water caused by wind drift of the surface vessel and by water currents well beneath the surface. If a direct wire connection is maintained between the surface vessel and the hydrophone small turbulent eddies form down stream from the wire inducing an oscillatory motion in the wire which occasions an oscillatory shortening and lengthening of the whole wire. This disturbance will induce a false low frequency signal in the hydrophone.

Previous measures employed to overcome this false low frequency or self-noise signal have involved supporting the hydrophone from a submersible buoyancy chamber such that the whole has a slight positive buoyancy and permitting it to hover by balancing its buoyancy against a long length of light weight, though negatively buoyant, wire by which its signals are transmitted to a surface ship or close-coupling the hydrophone to a streamlined buoyancy configuration such that the whole is neutrally buoyant, and the configuration is in turn connected to a submerged weight by means of a length, say 50 feet, of neutrally-buoyant electrical wire. The weight, which hangs beneath the surface vessel, establishes the depth of the neutrally-buoyant configuration which streams out in the direction of the relative current.

Neither measure provides the desired omnidirectional sensitivity because the buoyancy chamber or streamlined buoyancy configuration and the supporting structure affect the directivity of the hydrophone very severely in the upper audio frequencies and because of inherent interference occasioned by the drag of the system and its imperfect streamlining.

A further difficulty heretofore encountered is that hydrophone sensitivity decreases with depth until, as hydrostatic pressure increases, the hydrophone and its external pre-amplifier are ultimately crushed. Also, the receiving response of cylindrical hydrophones varies spacially from omnidirectional at low frequencies (where the hydrophone is a minute fraction of a wavelength in size) to directional at high frequencies in a rather gradual fashion.

It has been found that these disadvantages may be overcome by constructing a neutrally buoyant hydrophone and associated pre-amplifier in a single omnidirectional unit capable of withstanding great hydrostatic pressures.

According to the invention such a hydrophone is constructed comprising a hollow substantially spherical shell of piezo-electric material with electrodes connected to the interior and exterior faces thereof and to electrical conductors so that changes in electrical potential between the electrodes can be transmitted to a remote location. A pre-amplifier having a high input and low output impedance may be installed inside the shell and connected between the electrodes and the pair of electrical conductors.

Figure 2:
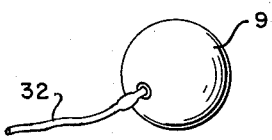

In drawings which illustrate an embodiment of the invention:

FIGURE 1 is a perspective view with the top shell raised out of position,

And FIGURE 2 is a plan view showing the attachment of the hydrophone to a neutrally buoyant wire.

Referring to FIGURE 1 a hydrophone 9 is shown comprising two hemispherical shells 10 and 11 of piezo-electric material and having similar dimension adapted to be cemented together to form a sphere. A pair of electrodes 12 and 13 are shaped to fit or coated on the inside surfaces of the two hemispherical shells 10 and 11 and a pair of electrodes 14 and 15 are shaped to fit or coated on the outside surfaces of the two hemispherical shells 10 and 11. A pre-amplifier 16 fits inside the sphere and is cushioned there by the resilient mounts 17 and 18. The pre-amplifier 16 has a high input impedance for connection to the conducting segments and a low output impedance to match the characteristic impedance of the signal output leads 24. The signal output leads 24 constitute means for transmitting to a remote location changes in electrical potential between the inner electrodes 12, 13 and the outer electrodes 14, 15. The hemispherical shells 10 and 11 are grooved at 19 and 20 to receive a short piece of copper conduit 21 which surrounds an inert mineral insulation 23 and has formed as a part thereof a shoulder 22 for aid in securing by cement or any other suitable means the conduit 21 to the hemispherical shells 10 and 11. Power and signal output leads 24 are contained within the mineral insulation 23. The hemispherical shells 10 and 11 are also grooved at positions 25 and 26 to receive wires 27 and 28 connecting the electrodes 14 and 15 to the pre-amplifier 16. Wires 29 and 30 connect the inner electrodes 12 and 13 to the pre-amplifier 16. A buoyant waterproof sheath 31 preferably of polyethylene material of sufficient thickness and buoyancy to overcome the high specific gravities of the elements of the hydrophone assembly surrounds the hydrophone in its assembled form with the result that the hydrophone is neutrally buoyant.

The hydrophone 9 in assembled form with neutrally buoyant wire 32 attached, as shown in FIG. 2, may be lowered to the depths of an ocean or other body of water and when sound waves impinge on the piezo-electric shells 10 and 11 a potential difference is caused between electrodes 14 and 12 and between electrodes 15 and 13. Wires 27, 28, 29 and 30 transfer this potential difference to pre-amplifier 16 where it is amplified and then transmitted to a remote location by the signal output leads 24.

This construction results in a hydrophone which minimizes self noise, which is able to withstand great hydrostatic pressure and which provides omnidirectional receiving response to pressure variations in the water.

I claim:

A hydrophone comprising a hollow substantially spherical shell of piezo-electric material, said shell having inner and outer faces; a first electrode positioned on and connected to said inner face, a second electrode positioned on and connected to said outer face, a waterproof sheath surrounding said second electrode, said waterproof sheath having a specific gravity of less than that of water and sufficient thickness to make said hydrophone neutrally buoyant; signal output means for transmitting potential differences between said first and second electrodes, preamplifier means electrically connected between said electrodes and said signal output means, and resilient support means within said spherical shell for physically mounting said preamplifier means therein.

References Cited by the Examiner

UNITED STATES PATENTS

| 2,413,462 | 12/1946 | Massa | 340—10 |
| 2,465,696 | 3/1949 | Paslay. | |
| 2,762,032 | 9/1956 | Vogel | 340—10 |
| 2,939,970 | 6/1960 | Drantez et al. | 340—10 X |
| 2,966,656 | 12/1960 | Bigbie et al. | 340—10 |

FOREIGN PATENTS

| 1,141,962 | 3/1957 | France | 340—10 |

CHESTER L. JUSTUS, *Primary Examiner.*

FREDERICK M. STRADER, KATHLEEN H. CLAFFY, *Examiners.*